(No Model.) 2 Sheets—Sheet 1.
D. H. WILSON.
ELECTRIC MOTOR.
No. 476,347. Patented June 7, 1892.
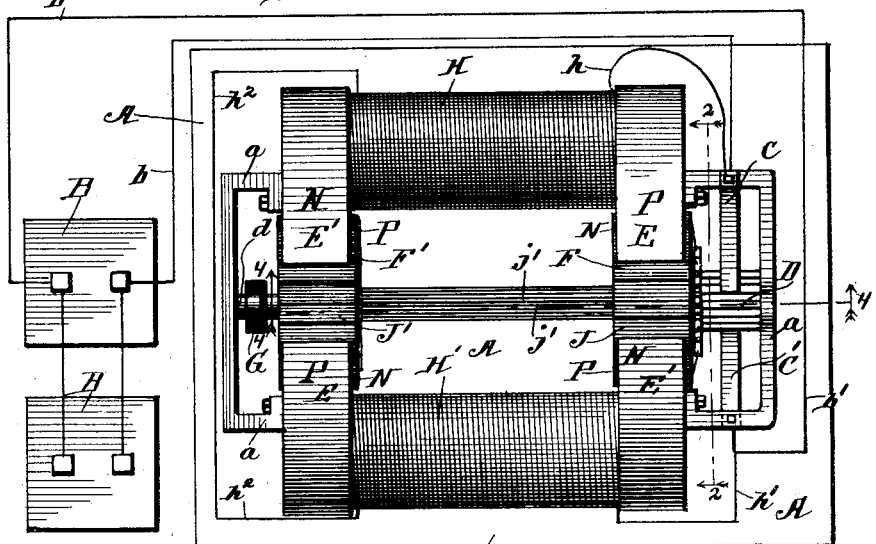
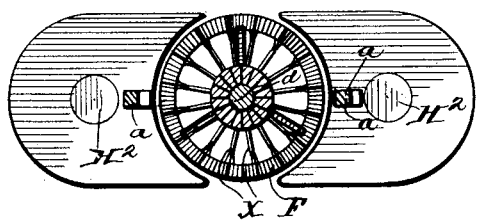
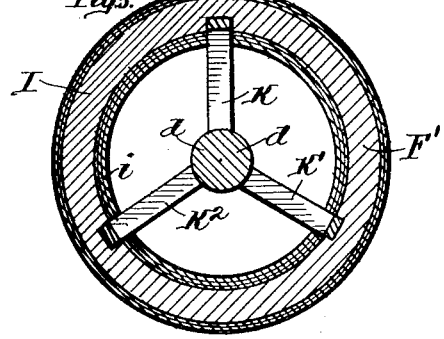
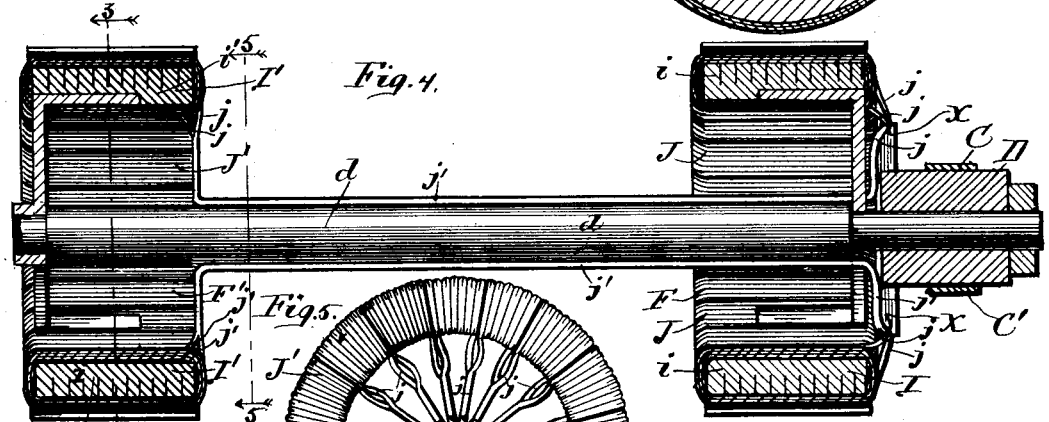
Witnesses:
Lute S. Alter
Flora L. Brown.
Inventor:
David H. Wilson
By Charles T. Brown,
Atty.

(No Model.) 2 Sheets—Sheet 2.
D. H. WILSON.
ELECTRIC MOTOR.
No. 476,347. Patented June 7, 1892.
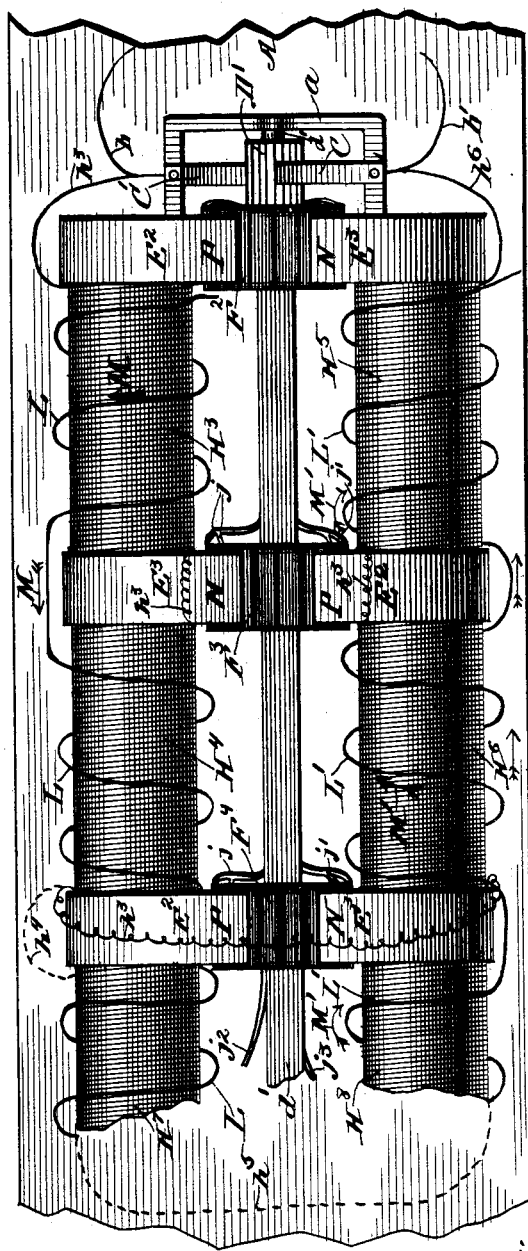
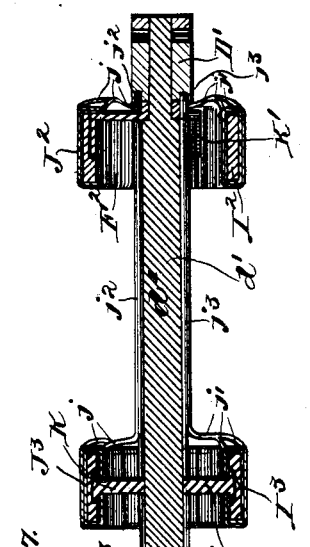
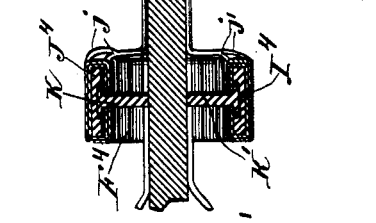
Witnesses:
Lute S. Alter,
Flora L. Brown
Inventor:
David H. Wilson.
By Charles T. Brown,
Atty.

UNITED STATES PATENT OFFICE.

DAVID H. WILSON, OF CHICAGO, ILLINOIS, ASSIGNOR OF ONE-TENTH TO CHARLES T. BROWN, OF SAME PLACE.

ELECTRIC MOTOR.

SPECIFICATION forming part of Letters Patent No. 476,347, dated June 7, 1892.

Application filed August 28, 1891. Serial No. 403,932. (No model.)

*To all whom it may concern:*

Be it known that I, DAVID H. WILSON, a citizen of the United States, residing at Chicago, in the county of Cook and State of Illinois, have invented certain new and useful Improvements in Electric Motors, of which the following is a specification.

My invention relates to that class of motors adapted to be driven by a dynamo-current, a storage-battery current, or a current from a primary battery, as preferred.

The object of my invention is to obtain a motor by which a larger percentage of the electric energy destroyed by the motor shall be obtained from such motor in the form of work than has heretofore been possible; a motor which can be economically constructed, not liable to get out of order, and one that will occupy less space than motors of the same horse-power heretofore built.

I have termed this motor a "double compound" motor from the fact that the fields are double—that is, the electro-magnetism of the negative and positive poles of two or more field-magnets are available for the production of force by having placed in proper position before them a series of armatures, such armatures being connected in multiple.

The manner in which I accomplish my purpose is fully described by this specification, in combination with the drawings accompanying and forming a part hereof, in which—

Figure 1 is a plan view of the motor and a battery of storage-batteries by which the motor can be operated; Fig. 2, a sectional view on line 2 2 of Fig. 1; Fig. 3, a cross-section on line 3 3 of Fig. 4, viewed in the direction indicated by the arrows; Fig. 4, a sectional view on line 4 4 of Fig. 1, showing the armature of the motor in longitudinal cross-section; Fig. 5, a sectional view on line 5 5 of Fig. 4, also viewed in the direction of the arrows. Fig. 6 is a plan view of a motor constructed on the same principle as the motor illustrated in Figs. 1 to 5, inclusive, but with an electro-magnet having more than one positive and negative pole. Fig. 7 is a cross-section on line 7 7 of Fig. 6, and Fig. 8 is a cross-section of one of the armature-heads on an enlarged scale.

Like letters refer to like parts throughout the several views.

A is the base on which the motor is mounted, and $a$ is the frame of such motor.

B B are storage-batteries from the negative and positive poles, whereof wires $b$ and $b'$ extend to the commutator-brushes C C', respectively, of the motor.

D is the commutator of the motor.

$d$ is the armature-shaft. Commutator D is rigidly mounted on shaft $d$.

E E' are the negative and positive poles of the electro-magnets forming the field-magnet of the motor illustrated in Figs. 1 to 5, both inclusive, E being the positive poles, and E' being the negative poles thereof.

F F' are the armatures of the motor. The armatures F F' are rigidly mounted on shaft $d$.

G is the driving-pulley of the motor, also rigidly mounted on shaft $d$.

The letters N and P in Fig. 1 apply to the polarity of the field-magnets and the armatures and indicate the negative and positive poles of each thereof at a given time when the motor is in operation.

H H' are the coils of the field-magnets, connected by wire $h^2$, and $h\ h'$ are wires extending therefrom, respectively, to the commutator-brushes C C' or to the wires $b\ b'$, the object being to divide the current extending over the wires $b\ b'$ to the commutator-brushes, so that a portion of such current shall extend through the coils H H', respectively, and the remainder of such current shall extend through the commutator-brushes, the commutator, and the armatures of the motor in the manner hereinafter described.

The negative and positive poles E E' of the electro-magnets, forming the field-magnet of the motor illustrated in Figs. 1 to 5, inclusive, are connected by the shaft or rod H², around which rod the coils H H', respectively, are wound.

The armatures F F' are constructed, respectively, of soft-iron rings I I', which form the core, around which are wound in the ordinary manner the several sections J J', composed of covered wire, there being sixteen of such sections in the armature illustrated in Figs. 1 to 5, inclusive, although, as will be evident to those skilled in the art, the number of such sections may be increased or decreased, according to the wish of the builder of the machine, in view of the result sought.

$j\,j'$ are the wires of which the sections J J' are wound.

By inspection of Fig. 4 the manner in which I am enabled to wind the armatures F F' in multiple can be seen—as, for instance, a wire extends from the commutator D to a point X, and from thence wire $j$ extends to and around section J in armature F, and wire $j'$ extends along the shaft $d$ to and around the corresponding section J' in armature F'. By winding wires $j\,j'$ in this manner the current, extending over the wire from the commutator to point X, is there divided, a portion thereof extending along such wire $j$ to the section J in armature F, around such armature to the pole of the commutator D on the under side thereof in contact with the commutator-brush C', and the remainder thereof extending along wire $j'$ to the corresponding section J' in armature F', around such armature to the opposite side thereof, and from thence back on the wire, extending to the pole of the commutator in contact with commutator-brush C'.

In order to obtain a north pole on one armature at a given point thereon and a south pole on the next adjacent armature at a corresponding point thereon, as is required, where the field-poles are, as marked in the drawings, the current extending around the wire of the armature-bobbins in one direction must extend around the corresponding bobbin in the other armature in the other direction. This is accomplished by connecting the inside end of the wire of one bobbin to point X and the outside end of the wire of the corresponding bobbin of the adjacent armature to such point X.

K K' K² are the arms, extending radially from shaft $d$ to and engaging with rings I I', respectively, holding such ring rigidly in position.

The manner in which a current extends from one pole of the electric-current-generating device B to the motor through the same and from thence back to the other pole of such electric-current-generating device can be readily understood by an inspection of Figs. 1 and 4. In Fig. 1 the current extends from the positive pole of one of the storage-batteries B to one of the commutator-brushes, being there divided, a portion thereof extending through the coils H H', and from thence back to the other pole of the electrical generator B, and the other portion extending through the commutator-brush to the commutator D, and from thence the current extends to point X, where it is again subdivided, a portion thereof extending on wire $j$ to and around the several sections J in armature F, the other portion extending on wire $j'$ to and through sections J' in armature F'. After extending around the several sections J J' of the armatures F F' such portion of the current extends through the commutator and from thence to the other commutator-brush and back to the generator B, along with the portion of such current which passed through the coils H H', as described. The armature-coils are thus, it will be observed by reference to the drawings, Fig. 4, so arranged by the manner in which the wire $j\,j'$ extends from point X as to be connected in multiple. The coils H H' are wound in series.

To wind the armature-coils in series, the point X is dispensed with and the wire from a bobbin in the first armature is carried to the corresponding bobbin in the adjacent armature and connected thereto, so that the current shall extend around such second bobbin in the opposite direction. Then the wire is brought back to the next bobbin of the first armature, around it, and back again to the second bobbin of the adjacent armature, as before, and so on until all the bobbins on all the armatures are wound.

In Figs. 6 and 7 more than one electro-magnet is placed on each side of the armature, such electro-magnets being wound in series on one side, the wire of which the coils are wound extending from the commutator-brush to the first of such coils on one side, and, after passing through such coil, through the next one thereof, and so on through the several coils on one side of the armature, and, after passing through the last of such coils, the wire extends to and through the coils on the electro-magnets on the other side of the armature, and from thence to the other commutator-brush.

$E^2\ E^3\ E^4$ are the poles of the field-magnets in Fig. 6, $E^2\ E^2$ being the positive poles and $E^3\ E^3$ the negative poles.

$H^3\ H^4\ H^5\ H^6$ are the coils of the electro-magnets $E^2\ E^3\ E^2$, respectively, wound with the wire $h^3$. Wire $h^3$ extends from the commutator-brush D to the coil $H^3$, through such coil in the manner indicated by the line L, extending around the coil, the current moving in the direction indicated by the arrow M by the side of such line, and after passing through the coil $H^3$ the wire $h^3$ extends from such coil $H^3$ into coil $H^4$, being wound in coil $H^4$ in the manner indicated by the line L thereon, and the current extending in such coil in the direction indicated by the arrow M by the side of such line L. After passing through or being wound into such coil $H^4$ the wire $h^3$ may extend therefrom to the next coil on the same side thereof, as is indicated by the dotted line $h^4$, extending to and around coil $H^7$, in the manner indicated by the line L, and continue in the same manner for any desired number of coils and electro-magnets, each adjacent coil being wound in the opposite direction. After being wound around and into the series of coils on one side of the armature (where more than one electro-magnetic coil is used on each side of the armature) such wire $h^3$ is brought to the coil on the other side of the armature, as is indicated by the dotted lines $h^5$, extending to coil $H^8$ and wound into such coil.

Where but two coils are placed upon one side of the armature, as H³ H⁴, the wire $h^3$ is brought from the end of coil H⁴ over to the coil H⁶, as illustrated in Fig. 6, and wound into such coil and from there to and into coil H⁵, in the manner indicated by the line L', and the current will extend through the coils in the direction indicated by the arrow M' by the side of such line L'. From coil H⁵ the wire will extend to the commutator-brush C', such last-named extension being lettered $h^6$. In this Fig. 6, $b\ b'$ are the wires extending from the electric generator to the commutator-brushes C C', respectively. D' is the commutator on shaft $d'$. F² F³ F⁴ are the armatures, each of them being rigidly mounted on the shaft $d'$ by arms K K' K², and constructed of the rings I² I³ I⁴, respectively, having wound around them the wire sections J² J³ J⁴, connected in the same way as the armatures in Figs. 1 to 5, inclusive. Each armature is the duplicate of the other, the different lettering being given to the different armatures merely for convenience of reference.

From each section of the commutator D' a wire $j^2$ or $j^3$ extends along the shaft $d'$ of the armature, and from wires $j^2\ j^3$ there extend the wires $j\ j'$, respectively, to the sections J² J³ J⁴ of the armatures F² F³ F⁴. It being understood that the wires $j^2$ and $j^3$ are identical and that wires $j$ and $j'$ are identical, the difference in lettering being given to wires $j^2$ and $j^3$ to indicate that one of such wires at a given time in the operation of the device extends to the section of the commutator in electrical connection with one of the commutator-brushes and the other thereof at such time extends to the section of the commutator in electrical connection with the other commutator-brush, with wires $j\ j$ branching off from wire $j^2$ and wires $j'\ j'$ branching off from wire $j^3$.

The current extending from the electrical generator to one of the commutator-brushes of the motor illustrated in Fig. 6 is there divided, a portion of such current extending through the armature and the remainder extending through the series of electro-magnetic coils described to the other commutator-brush or to the wire extending from the other pole of the electrical generator.

The manner in which the current extends through the armatures F² F³ F⁴ can be readily understood from inspection of Fig. 7, such current passing from the commutator-brush to one section of the commutator D' along wire $j^2$ to the several branch wires $j\ j\ j$, being subdivided thereby, then extending around the several armature-sections to the opposite side of each armature, and from thence on the wires $j'\ j'$ to the wire $j^3$ and back to the section of the commutator on the other side thereof, which is in electrical contact with the other commutator-brush and to such brush, from thence along with the portion of the current extending through the series of electro-magnetic coils back to the generator.

Having thus described my invention, what I claim, and desire to secure by Letters Patent, is—

1. In an electrical motor, a series of coils electrically connected together extending around a series of electro-magnets, the opposite coils of the series wound so that the electrical current therein shall extend in different directions around the core of the electro-magnets thereof, a series of armatures whereof the bobbins are wound so that the current extending in one direction in a bobbin on one armature will extend in the other direction in the corresponding bobbin of the adjacent armature secured on a common shaft, a commutator on such shaft in electrical connection with the series of armatures, and commutator-brushes in electrical contact with the commutator, in combination with a wire extending to one of the electro-magnetic coils and to one of the commutator-brushes and adapted to be electrically connected with one pole of an electrical generator, and a wire extending to the last one of the coils of the series and to the other commutator-brush and adapted to be attached to the other pole of an electrical generator, whereby a portion of a current extending from a generator attached to the wires will extend through the electro-magnetic coils and the remainder thereof through the commutator-brushes and the armatures of the motor, substantially as described.

2. In an electrical motor, the combination of more than one electro-magnetic coil wound and connected in series, the adjacent coils wound in a different direction, respectively, and having a common electro-magnetic pole, armatures arranged on a common shaft in front of the poles of the series of electro-magnets, adjacent ones of such armatures wound in opposite directions, a wire connecting with the wire forming the coil of the electro-magnets before such wire enters into the coil and with one of the commutator-brushes of the motor and adapted to be attached to one pole of an electrical generator, and a wire connecting with the wire extending from the last one of the series of electro-magnetic coils and with the other commutator-brush of the motor and adapted to be attached to the other pole of the electrical generator, substantially as described.

DAVID H. WILSON.

Witnesses:
CHARLES T. BROWN,
LUTE S. ALTER.